United States Patent
Chen

(10) Patent No.: US 10,816,992 B2
(45) Date of Patent: Oct. 27, 2020

(54) METHOD FOR TRANSFORMING 2D BOUNDING BOXES OF OBJECTS INTO 3D POSITIONS FOR AUTONOMOUS DRIVING VEHICLES (ADVS)

(71) Applicant: Baidu USA LLC, Sunnyvale, CA (US)

(72) Inventor: I-Kuei Chen, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 332 days.

(21) Appl. No.: 15/955,634

(22) Filed: Apr. 17, 2018

(65) Prior Publication Data

US 2019/0317519 A1    Oct. 17, 2019

(51) Int. Cl.

| | |
|---|---|
| *G05D 1/02* | (2020.01) |
| *G06K 9/00* | (2006.01) |
| *G06T 7/73* | (2017.01) |
| *G06T 7/33* | (2017.01) |
| *G06T 7/62* | (2017.01) |
| *G06N 20/00* | (2019.01) |

(52) U.S. Cl.
CPC ......... *G05D 1/0246* (2013.01); *G05D 1/0221* (2013.01); *G06K 9/00805* (2013.01); *G06N 20/00* (2019.01); *G06T 7/344* (2017.01); *G06T 7/62* (2017.01); *G06T 7/75* (2017.01)

(58) Field of Classification Search
USPC ...................................... 701/400–541, 23–28
See application file for complete search history.

(56) References Cited

U.S. PATENT DOCUMENTS

| | | | | |
|---|---|---|---|---|
| 8,527,199 | B1* | 9/2013 | Burnette | G08G 1/0141 |
| | | | | 701/450 |
| 8,718,861 | B1* | 5/2014 | Montemerlo | B60W 50/082 |
| | | | | 701/26 |
| 9,606,539 | B1* | 3/2017 | Kentley | G08G 1/166 |
| 9,632,502 | B1* | 4/2017 | Levinson | G01S 17/87 |
| 10,031,526 | B1* | 7/2018 | Li | G05D 1/0278 |
| 10,037,039 | B1* | 7/2018 | Zhu | G06T 7/13 |
| 10,162,363 | B1* | 12/2018 | Fairfield | G05D 1/021 |
| 10,318,822 | B2* | 6/2019 | Gao | B60W 10/04 |

(Continued)

FOREIGN PATENT DOCUMENTS

| | | |
|---|---|---|
| JP | 2004145660 | 5/2004 |
| JP | 2012094135 | 5/2012 |

(Continued)

*Primary Examiner* — Jonathan L Sample

(74) *Attorney, Agent, or Firm* — Womble Bond Dickinson (US) LLP

(57) ABSTRACT

In one embodiment, a system of an ADV perceives an object in a perspective view of the ADV using an image capturing device mounted on the ADV. The system generates a 2D bounding box for the object based on an image of the object captured by the image capturing device. The system determines an orientation and a 3D size of the object based on the image. The system projects onto the image a 3D representation of the object based on the orientation and the 3D size of the object. The system determines a distance from the ADV to the object based on the 3D representation of the object and the generated 2D bounding box. The system generates a trajectory in view of the determined distance from the ADV to the object to control the ADV to navigate the ADV around the object.

21 Claims, 12 Drawing Sheets

(56) References Cited

U.S. PATENT DOCUMENTS

| | | | | |
|---|---|---|---|---|
| 2014/0032108 | A1* | 1/2014 | Zeng | G08G 1/167 701/533 |
| 2014/0067187 | A1* | 3/2014 | Ferguson | B60W 30/12 701/28 |
| 2016/0091325 | A1* | 3/2016 | Takamatsu | B60W 30/10 701/408 |
| 2016/0140400 | A1* | 5/2016 | Chandraker | G08G 1/166 348/149 |
| 2016/0169683 | A1* | 6/2016 | Lynch | G01C 21/30 701/409 |
| 2016/0357262 | A1* | 12/2016 | Ansari | G06Q 10/0833 |
| 2017/0008521 | A1* | 1/2017 | Braunstein | G01C 21/36 |
| 2017/0123421 | A1* | 5/2017 | Kentley | B60W 30/00 |
| 2017/0123429 | A1* | 5/2017 | Levinson | G05D 1/0214 |
| 2017/0124476 | A1* | 5/2017 | Levinson | G01S 17/86 |
| 2017/0124781 | A1* | 5/2017 | Douillard | G08G 1/202 |
| 2017/0177937 | A1* | 6/2017 | Harmsen | G06K 9/00624 |
| 2017/0220876 | A1* | 8/2017 | Gao | G06K 9/3241 |
| 2017/0297488 | A1* | 10/2017 | Wang | G06T 5/006 |
| 2018/0012082 | A1* | 1/2018 | Satazoda | G06K 9/00805 |
| 2018/0045519 | A1* | 2/2018 | Ghadiok | G06K 9/2054 |
| 2018/0154899 | A1* | 6/2018 | Tiwari | B60W 60/0011 |
| 2018/0173971 | A1* | 6/2018 | Jia | G06K 9/6288 |
| 2018/0229724 | A1* | 8/2018 | Gutmann | G06K 9/3233 |
| 2018/0293445 | A1* | 10/2018 | Gao | G08G 1/16 |
| 2018/0348374 | A1* | 12/2018 | Laddha | G01S 7/4808 |
| 2018/0348775 | A1* | 12/2018 | Yu | B60W 30/1882 |
| 2019/0003839 | A1* | 1/2019 | Hu | G05D 1/0088 |
| 2019/0079526 | A1* | 3/2019 | Vallespi-Gonzalez | G01S 17/931 |
| 2019/0096086 | A1* | 3/2019 | Xu | G06K 9/00791 |
| 2019/0147600 | A1* | 5/2019 | Karasev | G06T 17/20 382/107 |
| 2019/0318481 | A1* | 10/2019 | Chen | G06T 7/12 |

FOREIGN PATENT DOCUMENTS

| | | |
|---|---|---|
| JP | 2015082326 | 4/2015 |
| JP | 2016224501 | 12/2016 |
| JP | 2017165158 | 9/2017 |

* cited by examiner

METHOD FOR TRANSFORMING 2D BOUNDING BOXES OF OBJECTS INTO 3D POSITIONS FOR AUTONOMOUS DRIVING VEHICLES (ADVS)

TECHNICAL FIELD

Embodiments of the present disclosure relate generally to operating autonomous vehicles. More particularly, embodiments of the disclosure relate to methods for transforming two-dimensional (2D) bounding boxes of objects into three-dimensional (3D) positions for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A perception of a surrounding environment may represent what an ordinary driver would perceive surrounding a vehicle in which the driver is driving. In perception, objects are often detected as 2D bounding boxes in an image plane. There is a need to convert the 2D bounding boxes into 3D objects having 3D positions (e.g., a vector to a center of the 3D objects) in camera coordinates and/or real-world coordinates.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Objects in images captured by image capturing devices for an ADV are usually detected by 2D bounding boxes from a machine learning model. According to one aspect, based on a 2D bounding box for an object with a known 3D size and orientations, the ADV can search for a 3D position of the object in the camera coordinate system. According to a first aspect, a system of an ADV perceives an object in a perspective view of the ADV using an image capturing device mounted on the ADV. The system generates, by a machine learning model, a 2D bounding box for the object based on an image of the object captured by the image capturing device. The system determines an orientation and a 3D size of the object based on the image of the object. The system projects onto the image a 3D representation of the object based on the orientation and the 3D size of the object. The system determines a distance from the ADV to the object based on the 3D representation of the object and the generated 2D bounding box. The system generates a trajectory in view of the determined distance from the ADV to the object to control the ADV to navigate the ADV around the object.

According to another aspect, the system shifts the projected object left or right until a center of the projected object is approximately centered to a horizontal axis of a 2D center of the 2D bounding box. The system shifts the projected object up or down until the center of the projected object is approximately centered to a vertical axis of the 2D center of the 2D bounding box. The system determines a center vector based on the shifting of the projected object and the determined distance to the object. The system controls the ADV based on the determined center vector to the object.

Figure 1:
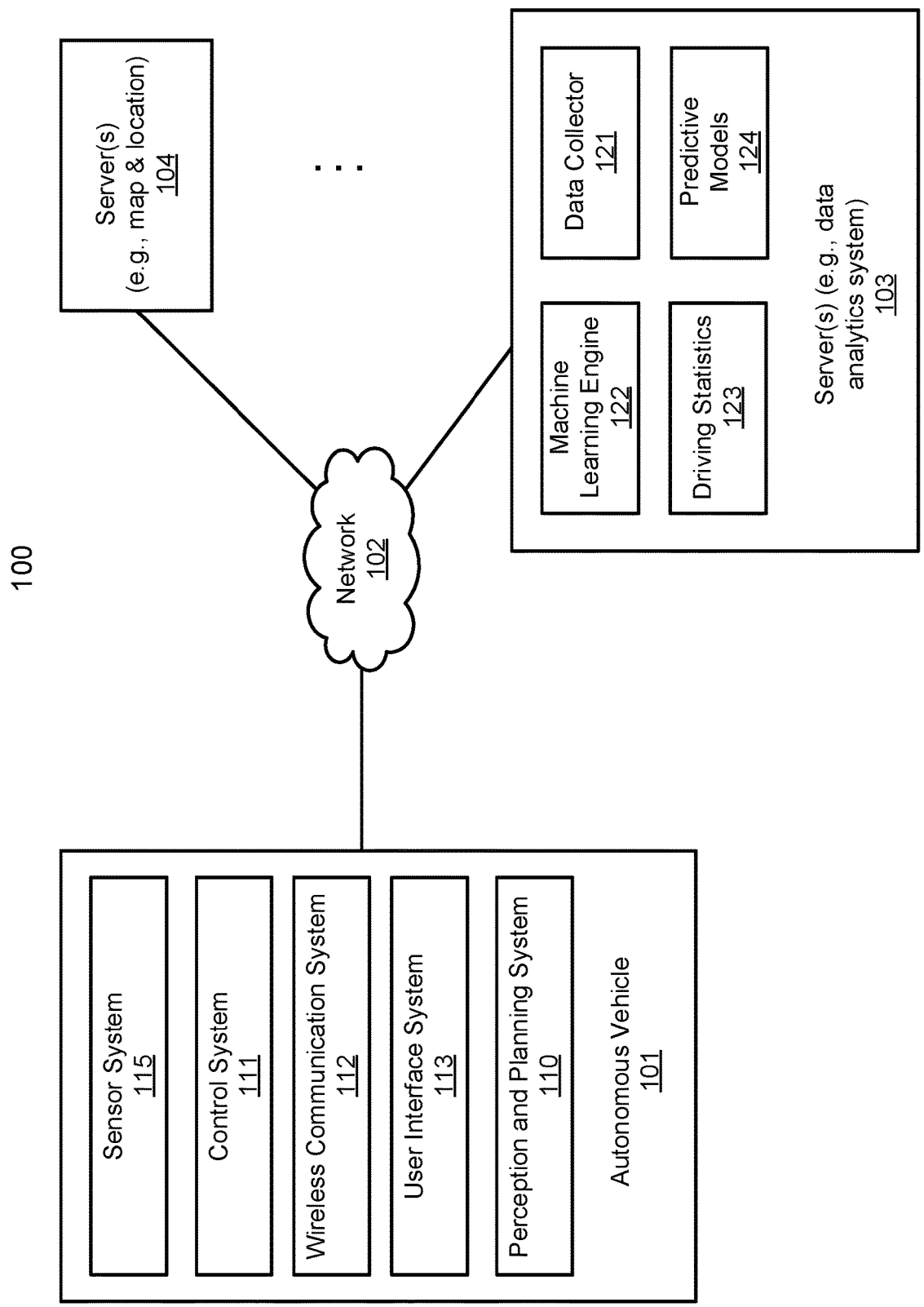
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
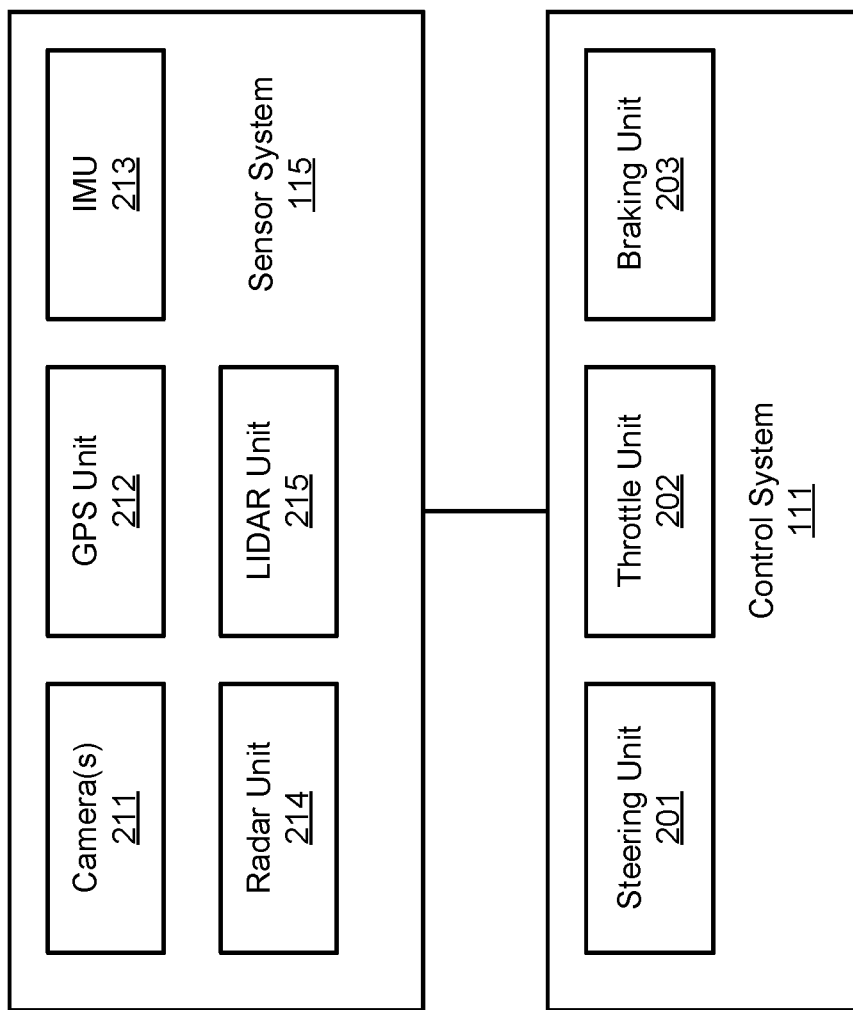
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including models to render 2D bounding boxes on to objects identified in images captured by an image capturing device of the ADV. Algorithms 124 may further include algorithms to determine 3D distances and orientations for objects.

Figure 3A:
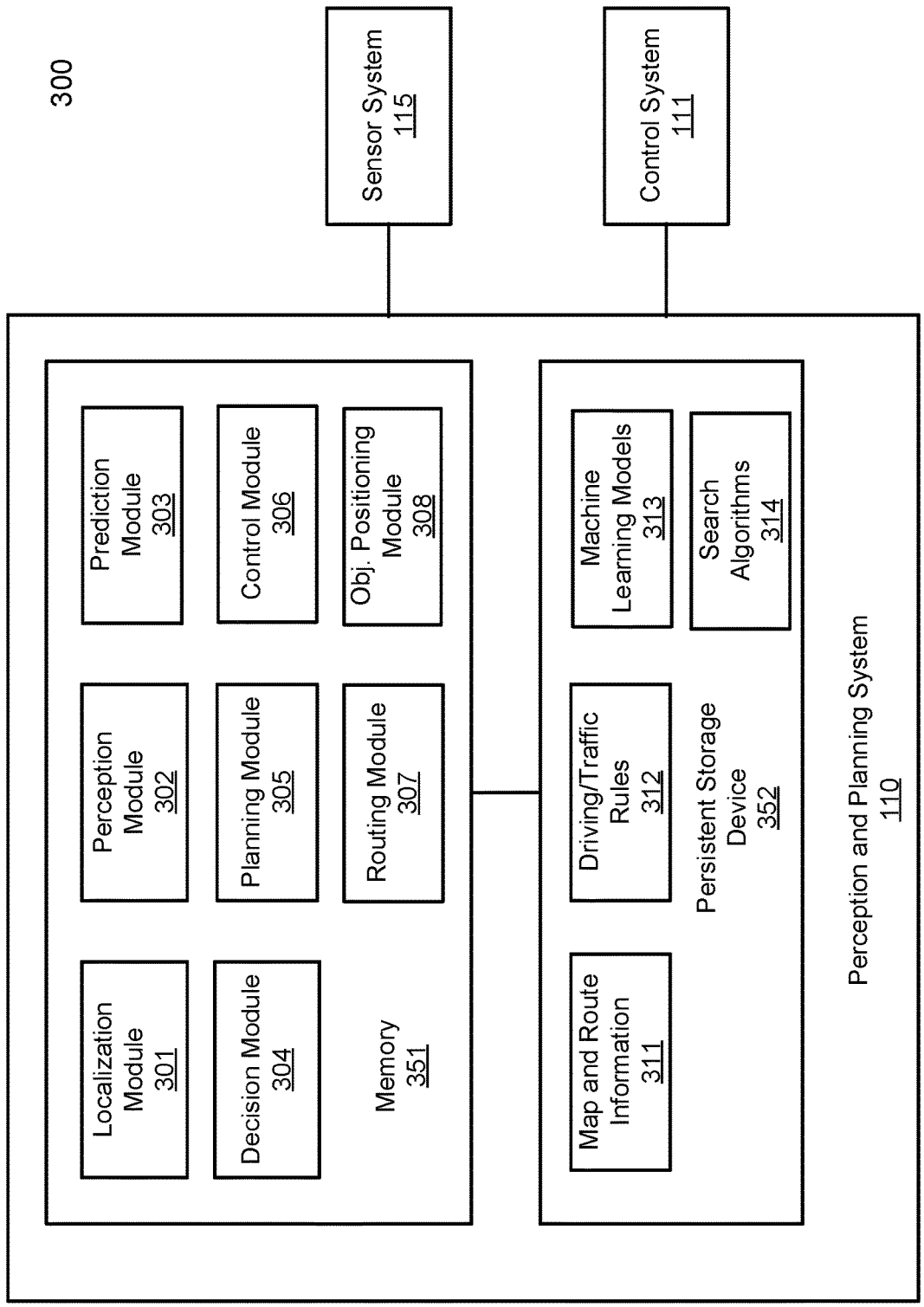
FIGS. 3A-3B are block diagrams illustrating an example of a perception and planning system used with an autonomous vehicle according to one embodiment.
Figure 3B:
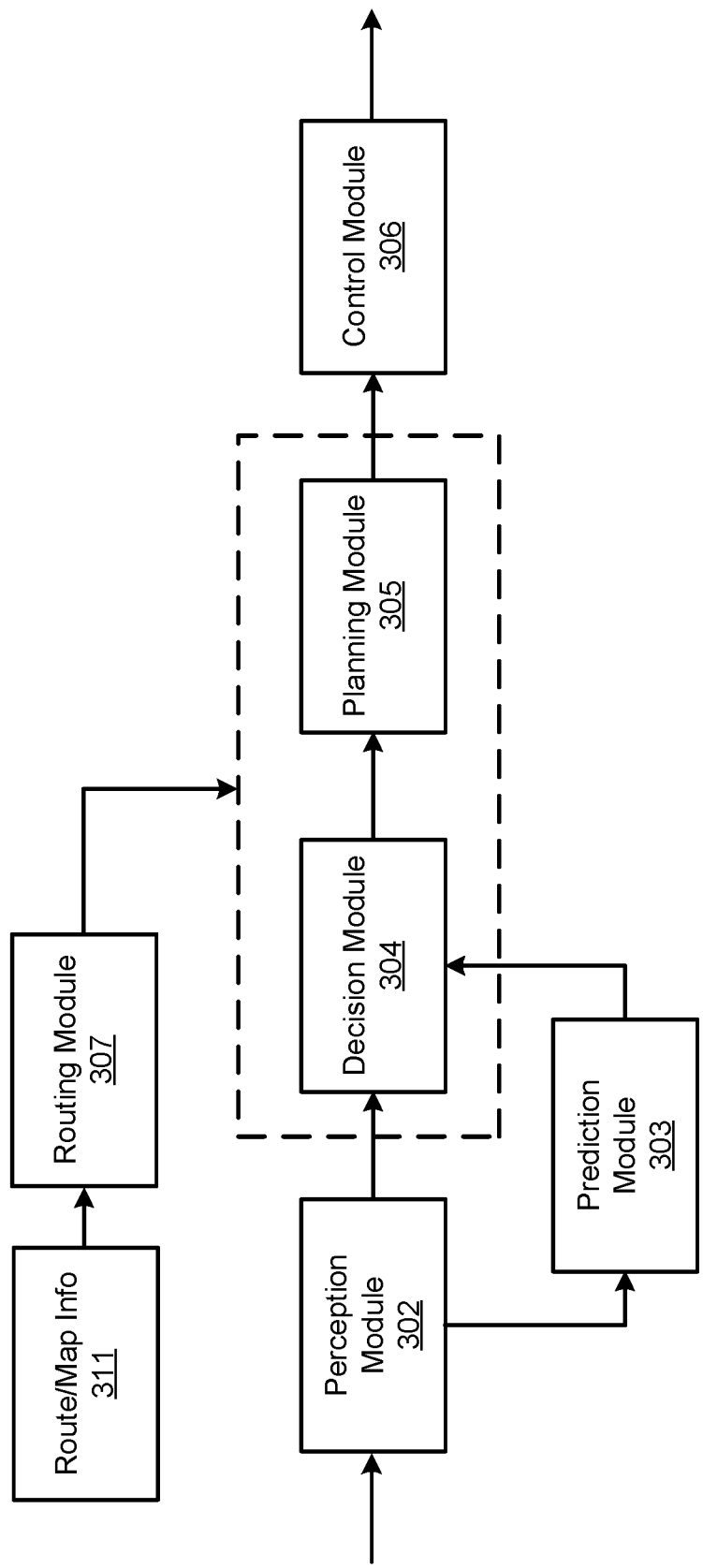

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and object positioning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

The planning phase may be performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. For example, planning module 305 may plan a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, object positioning module 308 can search for a 3D position for an object corresponding to a 2D bounding box generated by a machine learning model (as part of machine learning models 313). ADV 101 can then generate a driving trajectory to control the ADV based on the 3D position for the object. Object positioning module 308 may be implemented as a part of perception module 302.

Figure 4:
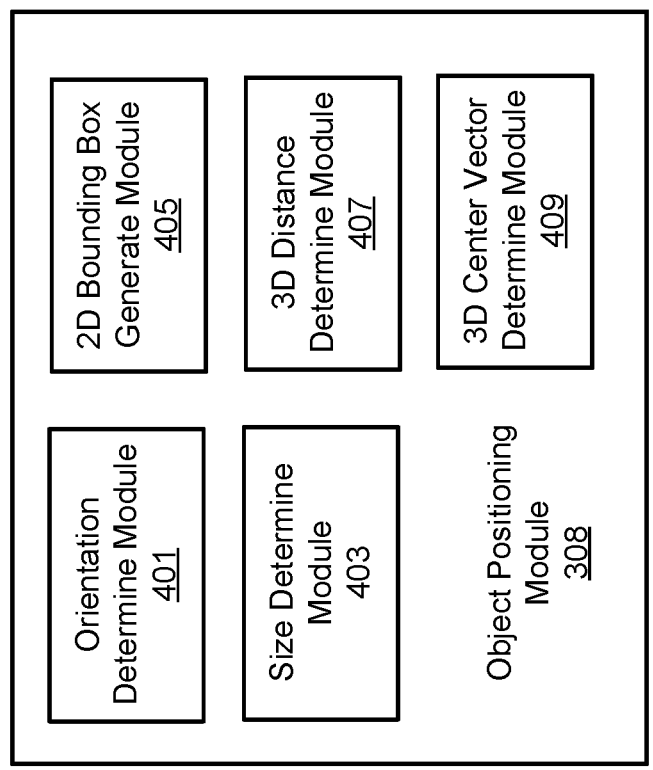
FIG. 4 is a block diagram illustrating an example of an object position module according to one embodiment.

FIG. 4 is a block diagram illustrating an example of an object positioning module according to one embodiment. Referring to FIG. 4, object positioning module 308 can include orientation determine module 401, size determine module 403, 2D bounding box generate module 405, 3D distance determine module 407, and 3D center vector determine module 409. Orientation determine module 401 can determine an orientation of the object. Size determine module 403 can determine a size of the object. 2D bounding box generate module 405 can generate a 2D bounding box for each object in an image. 3D distance determine module 407 can determine a distance from the ADV to the object in a three-dimensional coordinate system. 3D center vector determine module 409 can determine a center vector from the ADV to the object in the three-dimensional coordinate system.

Figure 5A:
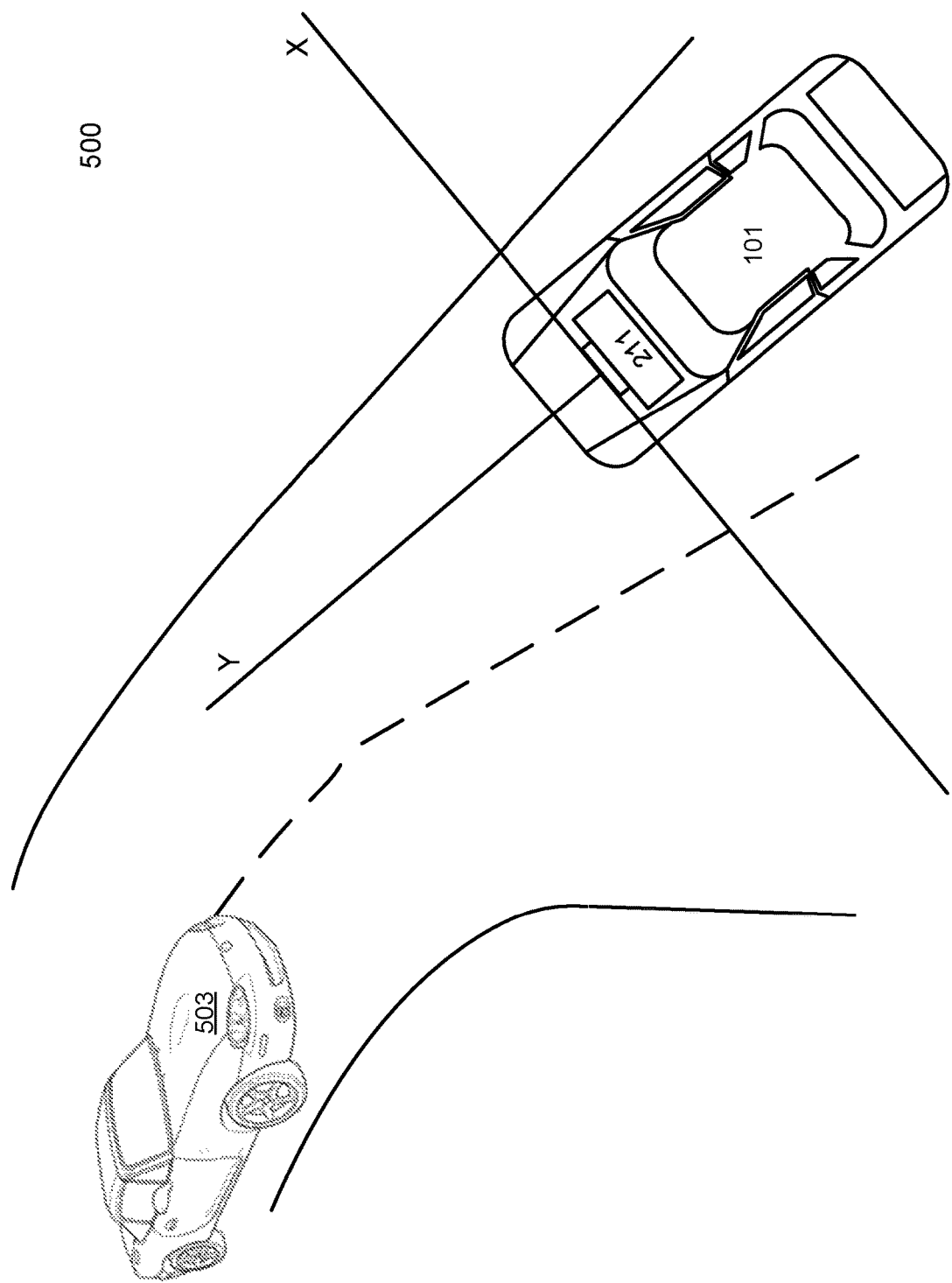
FIG. 5A is a block diagram illustrating an example of an ADV perceiving an object according to one embodiment.
Figure 5B:
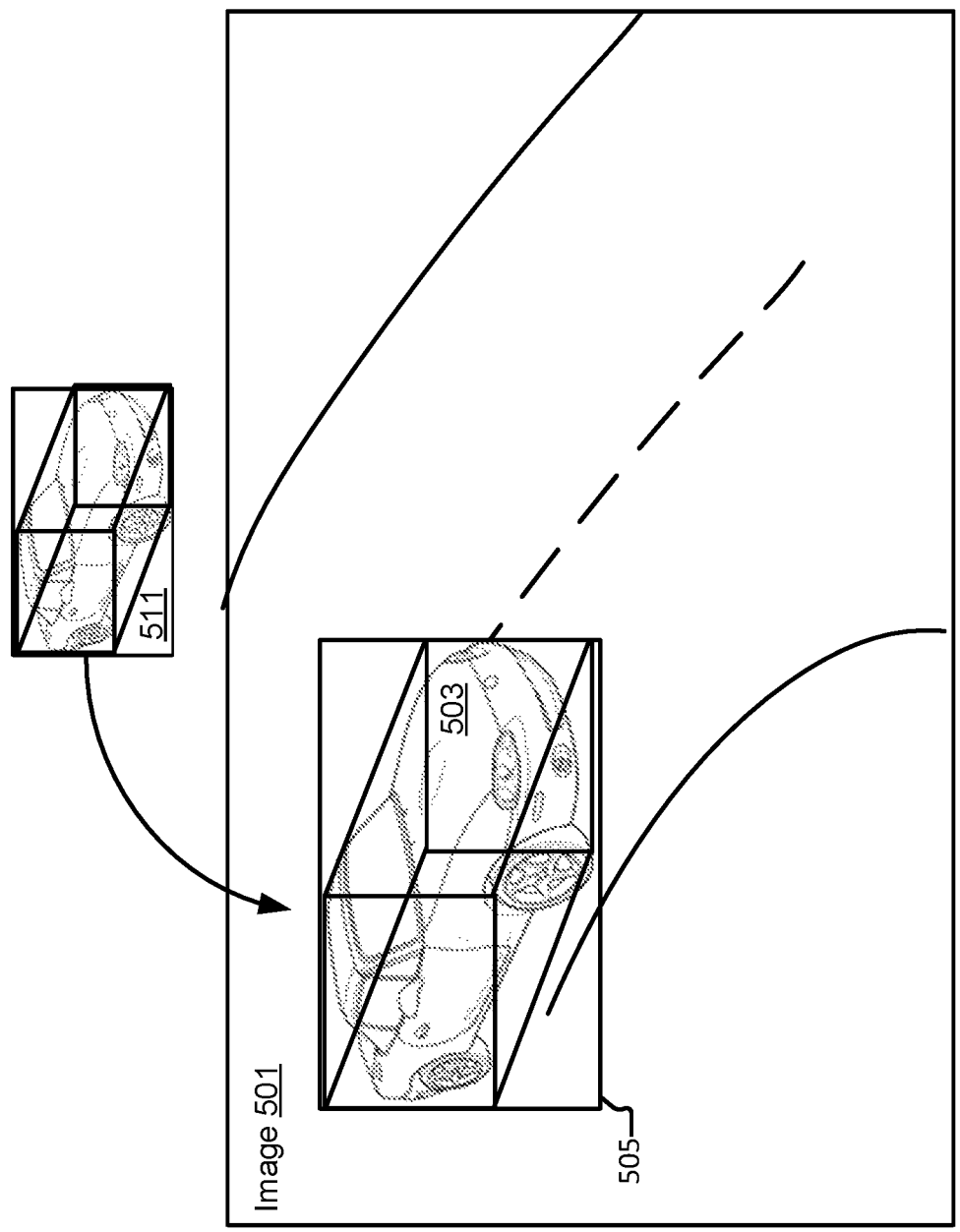
FIG. 5B is an example of an image for a perceived view for ADV 101 of FIG. 5A and a projection for a perceived object according to one embodiment.

FIG. 5A is a block diagram illustrating an example of an ADV perceiving an object according to one embodiment. FIG. 5B is an example of an image for a perceived view for ADV 101 of FIG. 5A and a projection for a perceived object according to one embodiment. The projection (e.g., projection 511) can be compared with a detected 2D bounding box (e.g., bounding box 505) to search for a 3D distance of the perceived object (e.g., vehicle 503). Referring to FIGS. 4 and 5A-5B, in one embodiment, example 500 includes ADV 101, camera 211 mounted onto ADV 101, and incoming vehicle 503 on a road section ahead of ADV 101 such that an image (e.g., image 501) captured by camera 211 captures vehicle 503. ADV 101 can apply a first machine learning model (as part of machine learning models 313) onto image 501 to generate 2D bounding boxes (e.g., bounding box 505 for vehicle 503) and/or 2D bounding boxes derived from 3D bounding boxes for each of the objects in the captured image.

Based on bounding box 505, an orientation determine module, such as orientation determine module 401 of FIG. 4, can apply a second machine learning model (as part of machine learning models 313) to determine an orientation (e.g., yaw, pitch, and roll of vehicle 503) and/or a 3D size for vehicle 503. In one embodiment, prior to determine an orientation and/or a 3D size of vehicle 503, orientation determine module 401 classifies object 503 to be a vehicle and determines the model and/or type of the vehicle based on a third machine learning model (as part of machine learning models 313) and/or an image recognition engine (as part of perception module 302). Here, the first, second, and third machine learning models for classifying object 503, determining object orientation and a 3D size, and generating 2D bounding boxes, can be the same or separate machine learning models previously trained to perform the various tasks. For example, the first, second, and third machine learning model(s) can be part of predictive models 124 of server 103. Furthermore, various machine learning models and computer vision algorithms can be used to generate the 2D bounding boxes, classify objects, and determining orientations and/or 3D sizes for the classified objects, including but not limited to, regression models, convolutional neural network, regional convolutional neural networks such as fast and faster regional convolutional neural networks, masked regional neural network, etc. In one embodiment, 2D bounding box 505 is tightened to fit the dimensions of vehicle 503. For example, a linear regression can be applied for each region of vehicle 503 to generate tight bounding box coordinates for the region until a dimension (e.g., a length or a width) of the bounding box in comparison with its previous dimension reaches a predetermined threshold or until a certain number of iteration has elapsed.

Based on a known object (e.g., a vehicle), and/or a known model type for the known vehicle, and a known orientation and/or 3D size, size determine module 403 can generate a 3D box (e.g., 3D representation) to represent the known vehicle having the known orientation and/or 3D size. For example, size determine module 403 may generate 3D representation 511 based on a known orientation and/or 3D size, and known model type for vehicle 503. Size determine module 403 then projects different sizes for 3D representation 511 onto an image plane of image 501. The different projections of 3D representation 511 (e.g., different sizes) can correspond to a perspective view of 3D representation 511 having different distances from ADV 101 to the corresponding 3D representation 511.

Based on a dimension (e.g., length or width) and/or an area of bounding box 505 and the different projections of 3D representation 511 (e.g., different sizes assuming different 3D distance positions), 3D distance determine module 407 can determine a corresponding distance based on a 3D representation 511 having a dimension that best matches the same dimension (e.g., a length, a width, or an area, e.g., length by width) of 2D bounding box 505. In one embodiment, the distance from the ADV to vehicle 503 is determined by searching (using a greedy search algorithm, a binary search algorithm, or other search algorithms as part of search algorithms 314) from different projected 3D presentations 511 to match a dimension (e.g., a length, a width, or an area, e.g., length by width) of projected 3D presentations 511 to a dimension of 2D bounding box 505 to a predetermined threshold or until a certain number of iteration has elapsed. The corresponding distance of the projected 3D representation 511 having the best matching size to 2D bounding box 505 would then be the determined distance from the ADV to vehicle 503. Note, a greedy algorithm is an algorithm that follows the problem solving heuristic (e.g., calculating a solution from some candidate selections to solve an objective function) of making the locally optimal choice at each stage with the hope of finding a global optimum. A binary search is a search algorithm that finds the position of a target value within a sorted array.

Figure 6A:
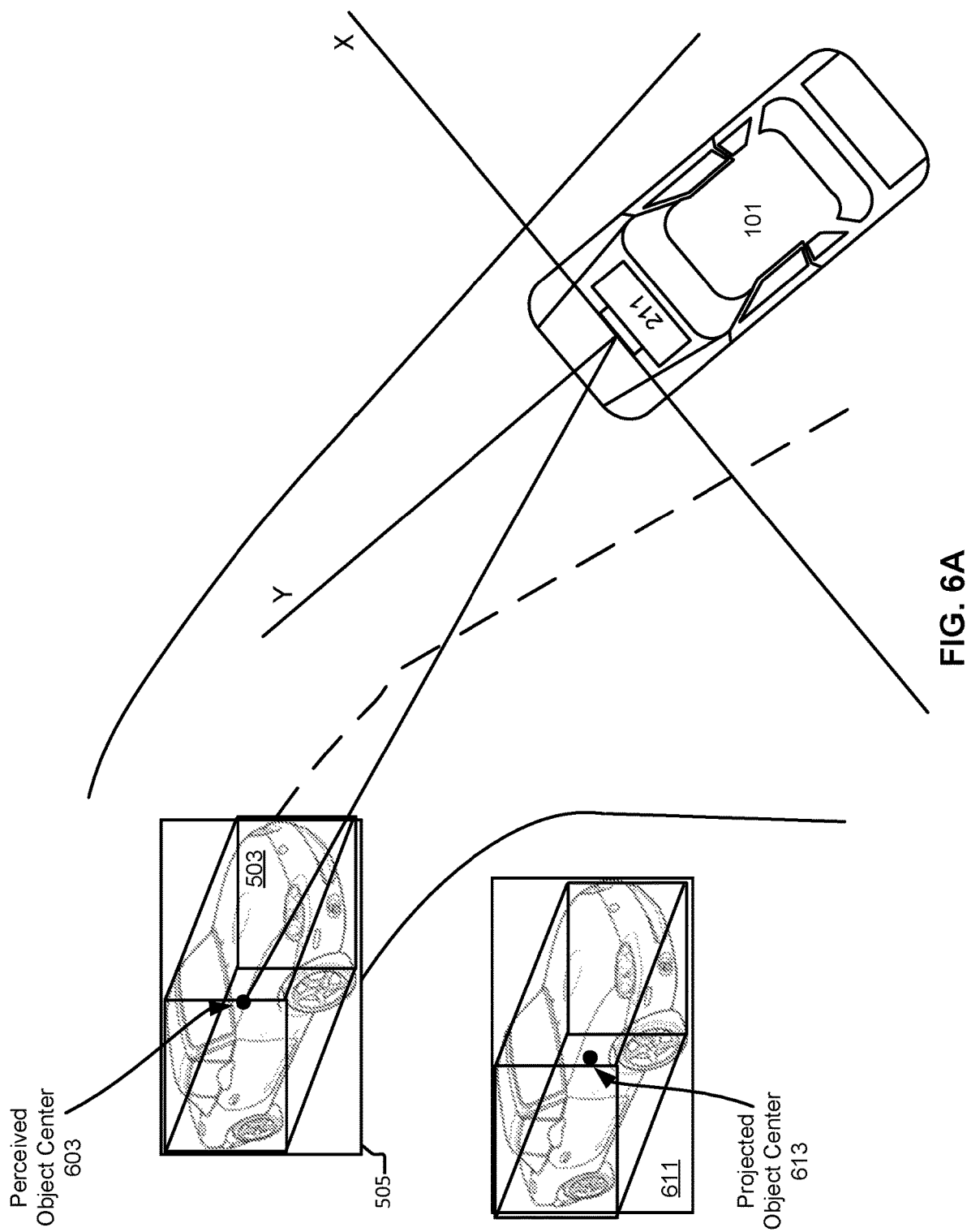
FIGS. 6A-6B are block diagrams illustrating examples of an ADV perceiving an object from a perspective view and shown in an aerial view respectively according to one embodiment.
Figure 6B:
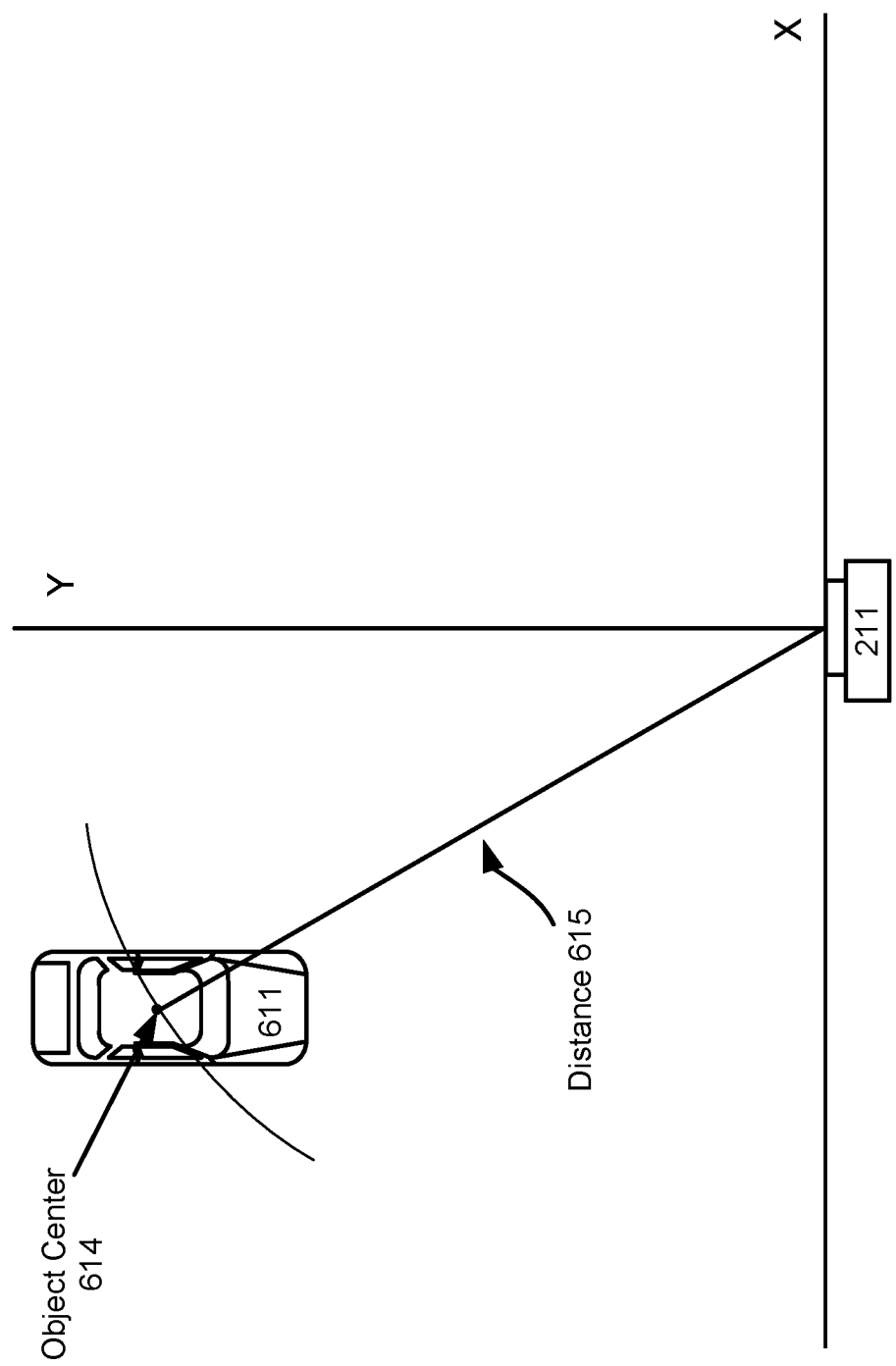

FIGS. 6A-6B are block diagrams illustrating examples of an ADV perceiving an object for a perspective view and an aerial view respectively according to one embodiment. Referring to FIG. 6A, projection 611 can be 3D projection 511 of FIG. 5, but projection 611 is a projection of a 3D object (e.g., 3D box) having a size that best match a dimension of the object for the 2D bounding box 505. Referring to FIG. 6B, projection 611 has associated object center location 613 and distance 615 from object center location 613 to camera 211. Here, distance 615 would be the previously determined distance.

In one embodiment, 3D center vector determine module 409 projects different 3D projections 611 onto an image plane such as an image plane of image 501, each of the 3D projection 611 being associated with a different object center location 614 (correspondingly a different object center location 613) but has the same size (e.g., same radial distance 615) to camera 211. Based on the different 3D projections 611, a 2D center for 2D bounding box 505 can then be best matched to a center of the 3D projection 611 to be within some predetermined threshold or until a certain number of iteration has elapsed. A ray from camera 211 projected on to object center location 614 of the best matching 3D projection 611, having a distance equal to distance 615, would then be the determined center vector. In one embodiment, a center vector is determined by searching (using a greedy search algorithm, a binary search algorithm, or other search algorithms as part of search algorithms 314) from the different projected 3D presentations 611 having different object center location coordinates, but keeping a radial distance constant (e.g., equal to previously determined ADV to object distance).

In one embodiment, the searching can be performed by initializing the projected object center location 613 to a midpoint of 2D bounding box 505. The search then shifts the projected image left or right until a center of the object of projection 611 is approximately centered to a horizontal axis of a 2D center of the 2D bounding box 505. The searching can then shift the projected image up or down until a center of the object of projection 611 is approximately centered to a vertical axis of the 2D center of 2D bounding box 505. The projected representation 611 having the best matching dimensions would then be the best candidate for determining the object center location. The object center location associated with projected representation 611 would then be used to determine the center vector.

Once the center vector is determined, the 3D position of vehicle 503 with respect to ADV 101 is known in camera coordinates. The center vector for the object (e.g., vehicle 503) can then be used by prediction module 303, decision module 304, and/or planning module 305 to generate a driving trajectory to control ADV 101 in view of vehicle 503. In some embodiments, 3D positions (e.g., center vectors) can be determined for two or more objects, e.g., two or more 2D bounding boxes of a captured image capturing the two or more objects. In some embodiments, the center vector(s) can be converted from one coordinate system to another. For example, once camera 211 is calibrated. With known calibration parameters, the determined center vector(s) can be converted from camera coordinates to real-world coordinates, and vice versa.

Figure 7:
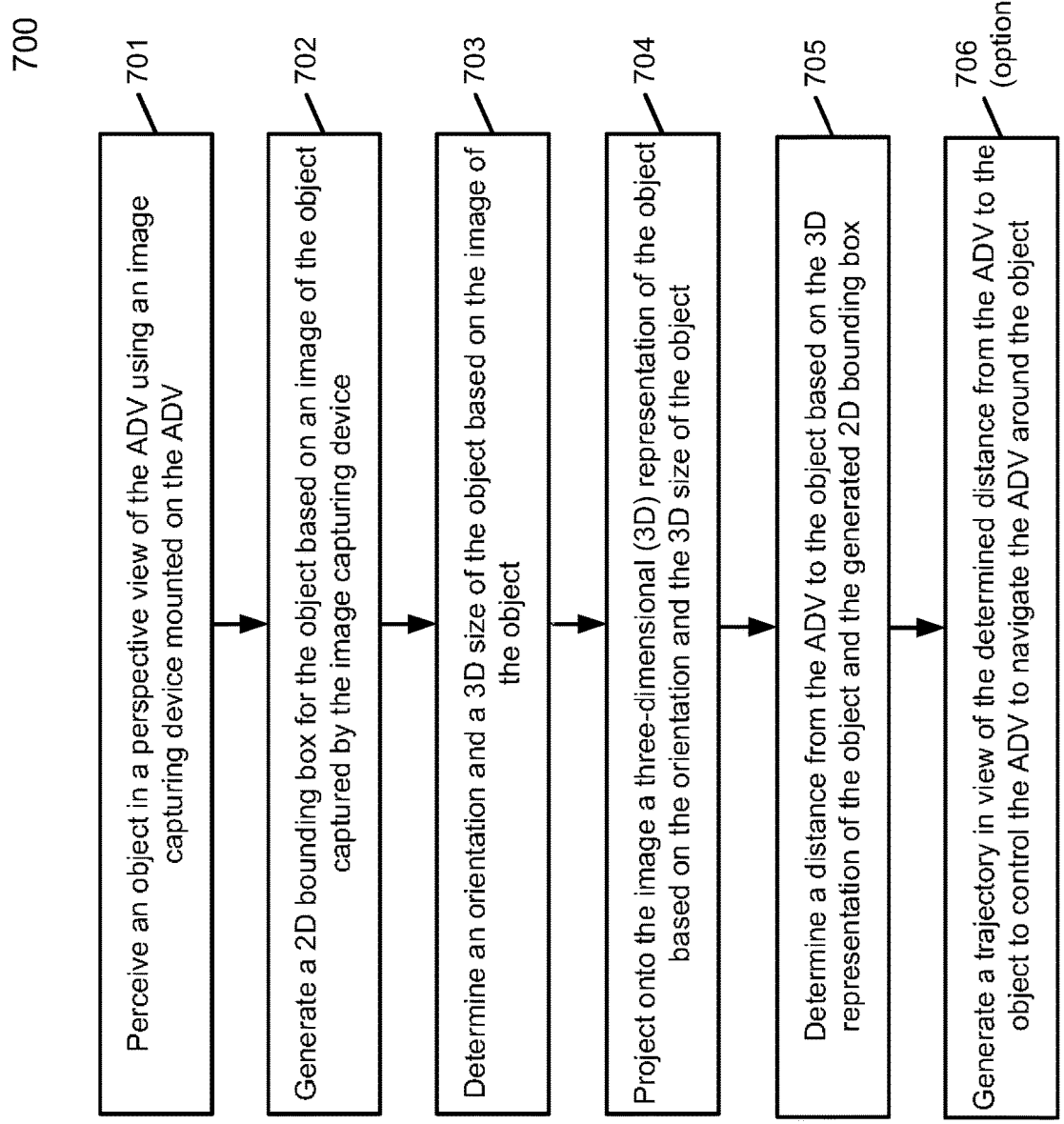
FIG. 7 is a flow diagram illustrating a method performed by an ADV according to one embodiment.

FIG. 7 is a flow diagram illustrating a method performed by an ADV according to one embodiment. Processing 700 may be performed by processing logic which may include software, hardware, or a combination thereof. For example, process 800 may be performed by object positioning module 308 of FIG. 3A. Referring to FIG. 7, at block 701, processing logic perceives an object in a perspective view of the ADV using an image capturing device mounted on the ADV. At block 702, processing logic generates a 2D bounding box for the object based on an image of the object captured by the image capturing device. At block 703, processing logic determines an orientation and a 3D size of the object based on the image of the object. At block 704, processing logic projects onto the image a three-dimensional (3D) representation of the object based on the orientation and the 3D size of the object. At block 705, processing logic determines a distance from the ADV to the object based on the 3D representation of the object and the generated 2D bounding box. At block 706, optionally, processing logic generates a trajectory in view of the determined distance from the ADV to the object to control the ADV to navigate the ADV around the object.

In one embodiment, the 2D bounding box for the object is generated by applying a machine learning model to the image capturing the object, and determining a length, a width, or an area of a 2D bounding box surrounding the object based on the machine learning model. In another embodiment, processing logic further searches a size of the projected image using a greedy search algorithm until a dimension of the projected image is within a predetermined threshold of the width or the height of the 2D bounding box, and determining the distance from the ADV to the object based on the size. In another embodiment, processing logic searching a size of the projected image using a binary search algorithm until a dimension of the projected image is within a predetermined threshold of the width, the height, or the area of the 2D bounding box. Processing logic then determining the distance from the ADV to the object based on the searched size.

Figure 8:
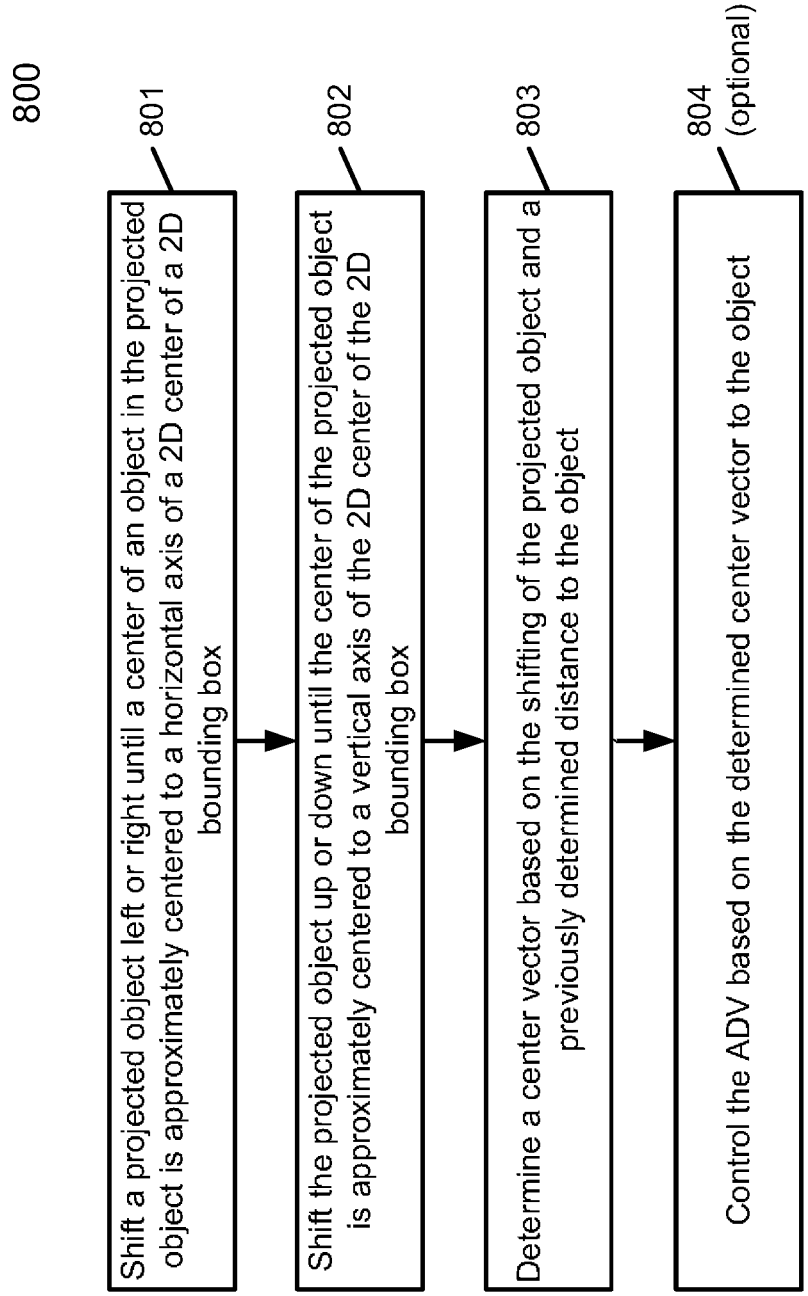
FIG. 8 is a flow diagram illustrating a method performed by an ADV according to one embodiment.

In one embodiment, processing logic further determines a center vector to the object based on the determined distance to the objected, wherein the center vector can be utilized to generate a trajectory to control the ADV. FIG. 8 is a flow diagram illustrating a method performed by an ADV according to one embodiment. Processing 800 may be performed by processing logic which may include software, hardware, or a combination thereof. For example, process 800 may be performed by object positioning module 308 of FIG. 3A. Referring to FIG. 8, at block 801, processing logic shifts a projected object left or right until a center of the projected object is approximately centered to horizontal axis of a 2D center of a 2D bounding box. At block 802, processing logic shifts the projected object up or down until the center of the projected object is approximately centered to a vertical axis of the 2D center of the 2D bounding box. At block 803, processing logic determines a center vector based on the shifting of the projected object and a previously determined distance to the object. At block 804, optionally, processing logic controls the ADV based on the determined center vector to the object.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
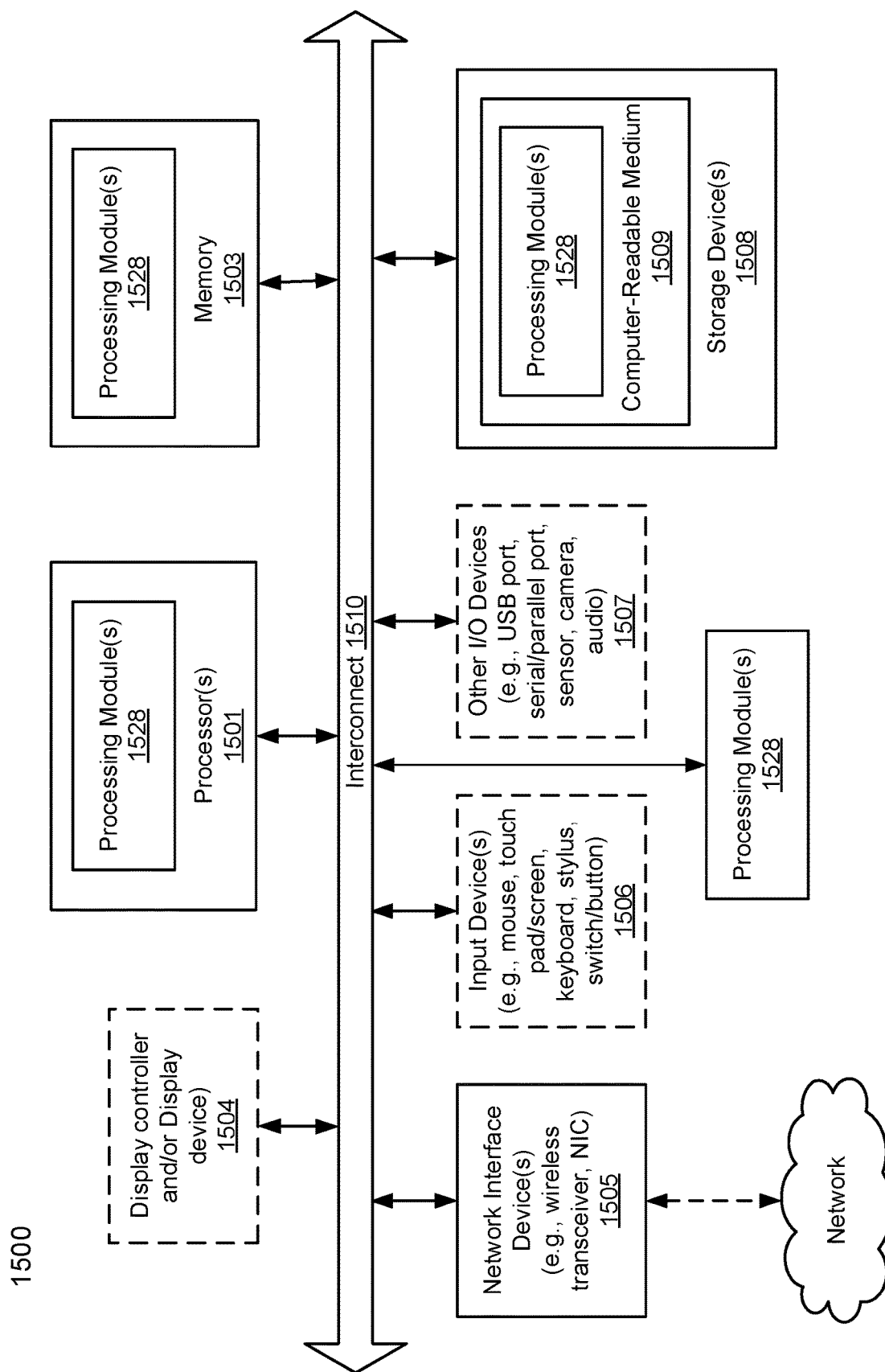
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110, or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, object positioning module 308 of FIG. 3A. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    perceiving an object in a perspective view of the ADV using an image capturing device mounted on the ADV;
    generating a 2D bounding box for the object based on an image of the object captured by the image capturing device;
    classifying the object to be one of a plurality of known objects based on the image of the object;
    determining an orientation and a size of the object based on the classification;
    projecting onto the image a plurality of three-dimensional (3D) representations of the object having a similar orientation and size as the object, wherein the plurality of 3D representations represents the object with varying distances to the ADV;
    determining a distance from the ADV to the object based on a dimension of a selected one from the plurality of 3D representations that approximately matches the dimension of the 2D bounding box; and
    generating a trajectory in view of the determined distance from the ADV to the object to control the ADV to navigate around the object.

2. The computer-implemented method of claim 1, wherein the 2D bounding box for the object is generated by:
    applying a machine learning model to the image capturing the object; and
    determining a length, a width, or an area of a 2D bounding box surrounding the object based on the machine learning model.

3. The computer-implemented method of claim 2, further comprising:
    searching a size for each of the plurality of 3D representations using a greedy search algorithm until a dimension of the projected 3D representation is within a predetermined threshold of the width or the height of the 2D bounding box; and
    determining the distance from the ADV to the object based on the size.

4. The computer-implemented method of claim 2, further comprising:
    searching a size for each of the plurality of 3D representations using a binary search algorithm until a dimension of the projected 3D representation is within a predetermined threshold of the width, the height, or the area of the 2D bounding box; and
    determining the distance from the ADV to the object based on the size.

5. The computer-implemented method of claim 1, further comprises determining a center vector to the object based on the determined distance to the objected, wherein the center vector can be used to generate a driving trajectory to control the ADV.

6. The computer-implemented method of claim 5, wherein determining a center vector of the object comprises:
    shifting a 3D representation of the object left or right until a center of the 3D representation is approximately centered to a horizontal axis of a 2D center of the 2D bounding box;
    shifting the 3D representation or down until the center of the 3D representation is approximately centered to a vertical axis of the 2D center of the 2D bounding box; and
    determining the center vector based on the shifting of the 3D representation and the determined distance to the object.

7. The computer-implemented method of claim 6, further comprises controlling the ADV based on the determined center vector to the object.

8. A non-transitory machine-readable medium having instructions stored therein, which when executed by one or more processors, cause the one or more processors to perform operations, the operations comprising:
perceiving an object in a perspective view of the ADV using an image capturing device mounted on the ADV;
generating a 2D bounding box for the object based on an image of the object captured by the image capturing device;
classifying the object to be one of a plurality of known objects based on the image of the object;
determining an orientation and a 3D size of the object based on the classification;
projecting onto the image a plurality of three-dimensional (3D) representations of the object having a similar orientation and size as the object, wherein the plurality of 3D representations represents the object with varying distances to the ADV;
determining a distance from the ADV to the object based on a dimension of a selected one from the plurality of 3D representations that approximately matches the dimension of the 2D bounding box; and
generating a trajectory in view of the determined distance from the ADV to the object to control the ADV to navigate the ADV around the object.

9. The non-transitory machine-readable medium of claim 8, wherein the 2D bounding box for the object is generated by:
applying a machine learning model to the image capturing the object; and
determining a length, a width, or an area of a 2D bounding box surrounding the object based on the machine learning model.

10. The non-transitory machine-readable medium of claim 9, further comprising:
searching a size for each of the plurality of 3D representations using a greedy search algorithm until a dimension of the 3D representation is within a predetermined threshold of the width or the height of the 2D bounding box; and
determining the distance from the ADV to the object based on the size.

11. The non-transitory machine-readable medium of claim 9, further comprising:
searching a size for each of the plurality of 3D representations using a binary search algorithm until a dimension of the 3D representation is within a predetermined threshold of the width, the height, or the area of the 2D bounding box; and
determining the distance from the ADV to the object based on the size.

12. The non-transitory machine-readable medium of claim 8, further comprises determining a center vector to the object based on the determined distance to the objected, wherein the center vector can be used to generate a driving trajectory to control the ADV.

13. The non-transitory machine-readable medium of claim 12, wherein determining a center vector of the object comprises:
shifting a 3D representation of the object left or right until a center of the 3D representation is approximately centered to a horizontal axis of a 2D center of the 2D bounding box;
shifting the 3D representation up or down until the center of the 3D representation is approximately centered to a vertical axis of the 2D center of the 2D bounding box; and
determining the center vector based on the shifting of the 3D representation and the determined distance to the object.

14. The non-transitory machine-readable medium of claim 13, further comprising controlling the ADV based on the determined center vector to the object.

15. A data processing system, comprising:
a plurality of processors; and
a memory coupled to the a plurality of processors to store instructions, which when executed by the a plurality of processors, cause the a plurality of processors to perform operations, the operations including
perceiving an object in a perspective view of the ADV using an image capturing device mounted on the ADV;
generating a 2D bounding box for the object based on an image of the object captured by the image capturing device;
classifying the object to be one of a plurality of known objects based on the image of the object;
determining an orientation and a 3D size of the object based on the classification;
projecting onto the image a plurality of three-dimensional (3D) representations of the object having a similar orientation and size as the object, wherein the plurality of 3D representations represents the object with varying distances to the ADV;
determining a distance from the ADV to the object based on a dimension of a selected one of the plurality of 3D representations that approximately matches the dimension of the 2D bounding box; and
generating a trajectory in view of the determined distance from the ADV to the object to control the ADV to navigate the ADV around the object.

16. The system of claim 15, wherein the 2D bounding box for the object is generated by:
applying a machine learning model to the image capturing the object; and
determining a length, a width, or an area of a 2D bounding box surrounding the object based on the machine learning model.

17. The system of claim 16, further comprising:
searching a size for each of the plurality of 3D representations using a greedy search algorithm until a dimension of the 3D representation is within a predetermined threshold of the width or the height of the 2D bounding box; and
determining the distance from the ADV to the object based on the size.

18. The system of claim 16, further comprising:
searching a size for each of the plurality of 3D representations using a binary search algorithm until a dimension of the 3D representation is within a predetermined threshold of the width, the height, or the area of the 2D bounding box; and
determining the distance from the ADV to the object based on the size.

19. The system of claim 15, further comprises determining a center vector to the object based on the determined distance to the objected, wherein the center vector can be used to generate a driving trajectory to control the ADV.

20. The system of claim 19, wherein determining a center vector of the object comprises:

shifting a 3D representation of the object left or right until a center of the 3D representation is approximately centered to a horizontal axis of a 2D center of the 2D bounding box;

shifting the 3D representation up or down until the center of the 3D representation is approximately centered to a vertical axis of the 2D center of the 2D bounding box; and determining the center vector based on the shifting of the 3D representation and the determined distance to the object.

21. The system of claim 20, further comprising controlling the ADV based on the determined center vector to the object.

* * * * *